June 25, 1929.  J. F. KOCA ET AL  1,718,421
SPOT LIGHT MOUNTING
Filed July 25, 1927  2 Sheets-Sheet 1
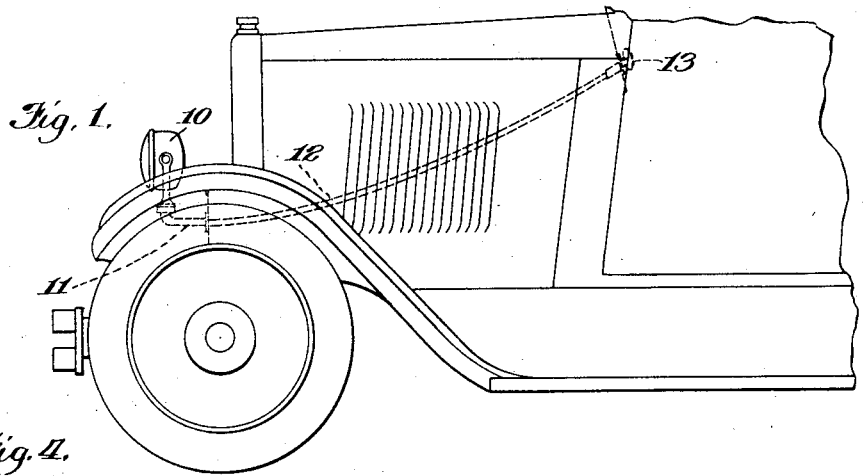
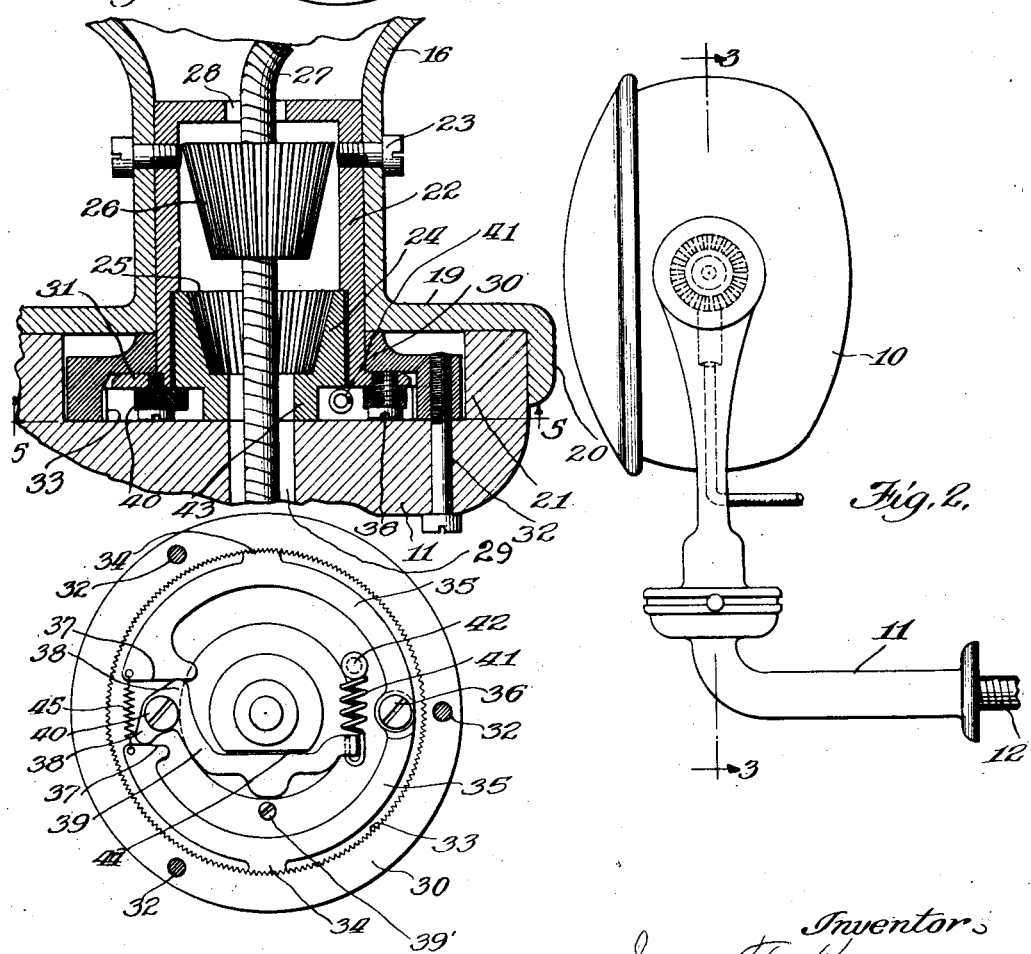
Inventors
James F. Koca
Herbert C. Behrens
By Nissen & Crane Attys.

Patented June 25, 1929.

1,718,421

UNITED STATES PATENT OFFICE.

JAMES F. KOCA AND HERBERT C. BEHRENS, OF WOODSTOCK, ILLINOIS, ASSIGNORS TO WOODSTOCK TYPEWRITER COMPANY, OF WOODSTOCK, ILLINOIS, A CORPORATION OF ILLINOIS.

SPOTLIGHT MOUNTING.

Application filed July 25, 1927. Serial No. 208,347.

This invention relates to a mounting for an adjustable light such as is used on automobiles for throwing a concentrated beam of light, and has for its object the provision of a mounting which will facilitate easy universal adjustment of the light so that the beam may be adjusted to the desired direction.

Other objects and advantages will appear from the following description.

The invention is exemplified in the combination and arrangement of parts shown in the accompanying drawings and described in the following specification, and it is more particularly pointed out in the appended claims.

In the drawings—

Fig. 1 is an elevation of a portion of an automobile showing one manner of mounting the present invention thereon;

Fig. 2 is an elevation of a spot-light provided with a mounting embodying the present invention;

Fig. 4 is a section of a clutch forming a part of the present invention; and

Fig. 5 is a section on line 5—5 of Fig. 4.

Figure 3:
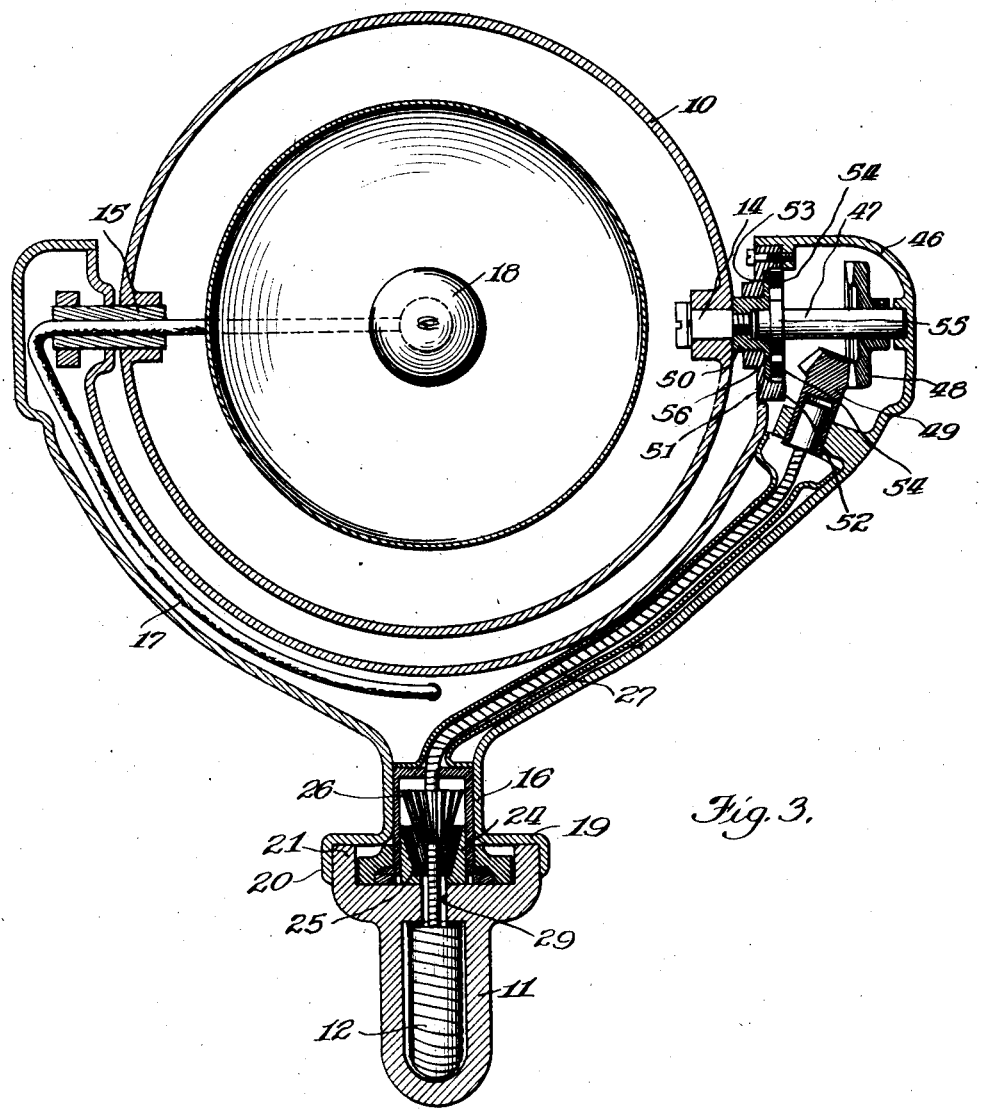
Fig. 3 is a section on line 3—3 of Fig. 2.

In the embodiment of the invention illustrated, a lamp housing 10 is supported on a bracket 11 which may be carried at any convenient place on an automobile or other support. A flexible conduit 12 extends backwardly from the bracket 11 to an operating knob 13 located on the dashboard. It will be apparent, of course, that the lamp housing may be mounted in various ways other than that illustrated in the drawings.

The housing 10, as shown more clearly in Fig. 3 of the drawings, is pivotally mounted on trunnions 14 and 15 which are supported on a hollow fork 16. The trunnion 15 is hollow to admit the electric conductor 17 which supplies current to the light bulb 18. The lower end of the fork 16 is provided with a radially extending plate 19 provided with a peripheral flange 20. The flange 20 surrounds a flange 21 on the bracket 11, as shown in Fig. 3, and the plate 19 rests upon the edge of the flange 21. A bushing 22 is arranged within the end of the fork 16 and fixed thereto by screws 23. A female clutch member 24 is journaled in the end of the bushing 22 and is provided with internal teeth 25 for engaging the teeth of a male clutch member 26. The clutch member 26 is fixed to a flexible shaft 27 which is arranged to slide longitudinally through an opening 28 in the end of the bushing 22 and through an opening 29 in the end of the bracket 11. The shaft 27 is also free to rotate upon its own axis and extends through the conduit 12 to the operating knob 13 to which the end of the shaft is secured. When the knob 13 is pushed forwardly the clutch members 24 and 26 will be disengaged, as shown in the drawings. When the knob is drawn rearwardly the clutch member 26 will be drawn into the member 24 and the two members will be locked together by the interengaging teeth. When the parts are in this position and the shaft 27 is rotated, the clutch member 24 will be driven by the member 26. Disposed within the flange 21 on the bracket 11 is a stop ring 30 which overlies a flange 31 on the bushing 22 and retains the bushing in operative relation with the bracket 11. The stop ring 30 is secured to the bracket 11 by screws 32. It will be apparent that the bushing 22 and the fork 16 are thus held rotatably connected to the bracket 11. The stop ring 30 is provided with internal teeth 33 which are engaged by toothed jaws 34 on locking arms 35. The arms 35 are pivoted at 36 to the flange 31 on the bushing 22. The ends of the arms 35 are provided with abutment faces 37 which engage cam lugs 38 on a lever 39 pivoted at 40 to the flange 31. One end of a spring 41 engages the end of the lever 39 and the other end of the spring is connected at 42 to the flange 31. The spring 41 presses the cam lugs 38 against the contact faces 37, thus forcing the jaws 34 outwardly into engagement with the stop ring 30. In this way the bushing 22 and consequently the lamp fork 16 is normally locked against rotation on the bracket 11.

The clutch member 24 is provided with a sleeve 43 having a flat face 44 on one side thereof. The face 44 lies adjacent the lever 39 so that when the clutch member 24 is rotated by the shaft 27, the flat face 44 will act as a cam to force the lever 39 outwardly against the tension of the spring 41. The ends of the arms 35 are connected by a spring 45 so that when the lever 39 is moved outwardly and the cam lugs 38 release the arms 35, the arms 35 will be drawn inwardly by the spring 45 and the jaws 34 will be disengaged from the teeth 33 on the stop ring 30. Outward movement of the lever 39 is limited by a stop pin 39' so that after the clutch 43 has been rotated a sufficient amount to release the jaws 34, further rotation of the clutch will carry the lever 39 in rotation with the clutch. Since the lever 39 is mounted on the flange 31, the bushing 22 and the fork 16 will be correspondingly rotated. This will shift the light housing 10 about its upright axis. It will thus be seen that when the knob 13 is drawn rearwardly and rotated, the initial effect will be to release the jaws 34 and thereafter the lamp housing will be rotated laterally about its upright axis, the direction of rotation of the housing depending upon the direction of rotation of the knob 13. As soon as the knob is released the spring 41 will again act to force the jaws 34 outwardly and automatically lock the lamp housing in the position to which it has been turned.

The end of the lamp fork 16 which carries the trunnion 14 is provided with an enlargement forming a housing 46 which encloses clutch mechanism similar to that for controlling rotation of the lamp housing about its upright axis. A stud shaft 47 is journaled in the housing 46 and is provided with a gear 48 arranged to mesh with a pinion 49 on the end of the shaft 27. When the knob 13 is moved forwardly to disengage the clutch member 26, the pinion 49 will be moved into engagement with the gear 48. In this position of the knob 13 the shaft 47 may be rotated without affecting the clutch mechanism which controls the movement of the lamp housing upon its vertical axis. When the knob 13 is drawn rearwardly to engage the clutch members 24 and 26, the pinion 49 will be moved out of engagement with the gear 48 so that operation of the clutch mechanism on the bracket 11 will not affect the shaft 47.

The housing 10 is rigidly secured to a bushing member 50 by means of the trunnion 14. The bushing member 50 is journaled in a stop plate 51 rigidly fixed to the housing 46. The plate 51 is provided with a flange 52 having internal teeth similar to the teeth on the stop ring 30. The bushing 50 is provided with a flange 53 having locking arms 54 thereon similar to the arms 35. The shaft 47 carries a cam collar 55 similar to the flange 43. A lever 56 co-operates with the collar 55 to release the clutch arms 54 in the manner of the lever 39 of the clutch shown in Figs. 4 and 5.

When the parts are in inactive position, the bushing 50 and consequently the housing 10 will be locked to the clutch flange 52, but when the gear 48 is rotated the first effect will be to operate the clutch mechanism to release the holding levers 54, and further rotation will move the bushing 50 and the lamp housing about its horizontal axis. The lamp will be rigidly held against movement both upon its upright axis and its horizontal axis. To swing it in either direction horizontally, the knob 13 will be pressed inwardly and then rotated in either direction until the light is brought into the desired position. To swing the light about a vertical axis, the knob 13 is drawn outwardly and rotated until the lamp is brought to the desired position. As soon as the knob is released, the lamp will be automatically locked in the position to which it has been turned.

We claim:—

1. In combination, a support for a light mounted for rotation about a pivotal axis, a circular stop rack, a clutch jaw for engaging said stop rack at various angular positions of adjustment of said support to lock said support against rotation, means for rotating said support having limited movement relative to said support, means operated by said rotating means for releasing said clutch jaw upon initial rotation of said rotating means in either direction, and a spring for returning said clutch jaw into engagement with said stop rack when said rotating means is released.

2. In combination, a support for a light mounted for rotation about a pivotal axis, an automatically operable clutch for locking said support in its various positions of angular adjustment, a rotary member for angularly adjusting said support, said rotary member having means thereon for releasing said clutch on initial rotation of said member, and a driving connection for operating said rotary member at a distance from said support.

3. In combination, a housing for a light mounted for rotation about axes disposed angularly relative to each other, separate automatically operating clutches for locking said housing against rotation about its respective axes, operating means for each of said clutches arranged to release said clutches respectively on initial rotation thereof and to rotate said housing upon further rotation thereof, and a single operating device for said operating means disposed at a distance from said housing, said device being selectively operable for actuating either of said operating means.

4. In combination, a light housing, means for supporting said housing for rotation about different axes disposed angularly relative to each other, separate spring-operated clutches for holding said housing against rotation about its respective axes, releasing means for each of said clutches operable to release their respective clutches upon initial rotation thereof and to rotate said housing on further rotation thereof, a flexible shaft, a guide for directing said shaft for movement longitudinally thereof, means on said shaft for connecting said shaft with the releasing means for one of said clutches when said shaft is moved longitudinally to one position, and means on said shaft for connecting said shaft with the other of said clutches when said shaft is moved longitudinally to a different position.

5. In a dirigible spotlight for automobiles, the combination with a bracket, of a lamp support mounted on said bracket for rotation on an upright axis, a lamp mounted on said support for rotation on a horizontal axis, a clutch for locking said lamp in adjusted position to said lamp support, an additional clutch for locking said lamp support in adjusted position on said bracket, an operating shaft mounted for longitudinal movement and rotary movement, and actuating gearing between said shaft and said clutches to connect said shaft to either one or the other of said clutches so that when thus connected the turning of the shaft will release one or the other of the clutches so as to turn the lamp either on the horizontal axis or the vertical axis.

6. In a dirigible spotlight for automobiles, the combination with a light housing mounted for rotation about pivotal axes substantially at right angles to each other, of radially acting spring-held clutch devices one associated with each of said axes for locking the said housing against rotation, and a single operating device for selectively releasing said clutch devices by rotation thereof and for rotating said housing about either axis after the release of the clutch device associated therewith.

7. In dirigible spotlights for automobiles, the combination with a lamp housing, of means for supporting said lamp housing for angular adjustment on either of two transverse axes, two automatic locking devices one associated with each of said axes, a flexible operating shaft, means connected between said shaft and said locking devices for releasing either one or the other thereof by rotary motion of said shaft, and means for automatically restoring the locking devices to locking positions when said flexible shaft is released.

8. In dirigible spotlights for automobiles, the combination with a lamp support mounted to rotate about a pivotal axis, of an automatically applied clutch for holding said support against rotation in its various positions of adjustment about said axis, a driver for rotating said lamp support in either direction about said pivotal axis, and means operated by the rotation of said driver in either direction for first releasing said clutch by such rotary movement and then rotating said lamp support on said axis, said clutch being applied automatically upon the release of said driver to hold the said lamp support in its adjusted position.

In testimony whereof we have signed our names to this specification on this 20th day of July, A. D. 1927.

JAMES F. KOCA.
HERBERT C. BEHRENS.